5 Sheets—Sheet 1.

I. LANCASTER.

GRAIN BINDER.

No. 7,491. Reissued Feb. 6, 1877.

Witnesses.

C. Clarence Poole

Aug. J. Jordan

Inventor:

Israel Lancaster

By his atty

R. D. O. Smith.

N. PETERS, PHOTO-LITHOGRAPHER, WASHINGTON, D. C.

5 Sheets—Sheet 2.

I. LANCASTER.

GRAIN BINDER.

No. 7,491. Reissued Feb. 6, 1877.

Witnesses:

C. Clarence Poole

Aug. Jordan

Inventor:

Israel Lancaster

By his atty

R. D. O. Smith

N. PETERS, PHOTO-LITHOGRAPHER, WASHINGTON, D. C.

I. LANCASTER.

GRAIN BINDER.

No. 7,491. Reissued Feb. 6, 1877.

Witnesses:
C. Clarence Poole
Aug. Jordan

Inventor:
Israel Lancaster,
By his Atty
R. D. O. Smith.

N. PETERS, PHOTO-LITHOGRAPHER, WASHINGTON, D. C.

5 Sheets—Sheet 4.

I. LANCASTER.

GRAIN BINDER.

No. 7,491.

Reissued Feb. 6, 1877.

Witnesses:

C. Clarence Poole

Augs Jordan

Inventor:

Israel Lancaster

By his Atty R. D. Smith.

N. PETERS, PHOTO-LITHOGRAPHER, WASHINGTON, D. C.

I. LANCASTER.
GRAIN BINDER.
No. 7,491. Reissued Feb. 6, 1877.
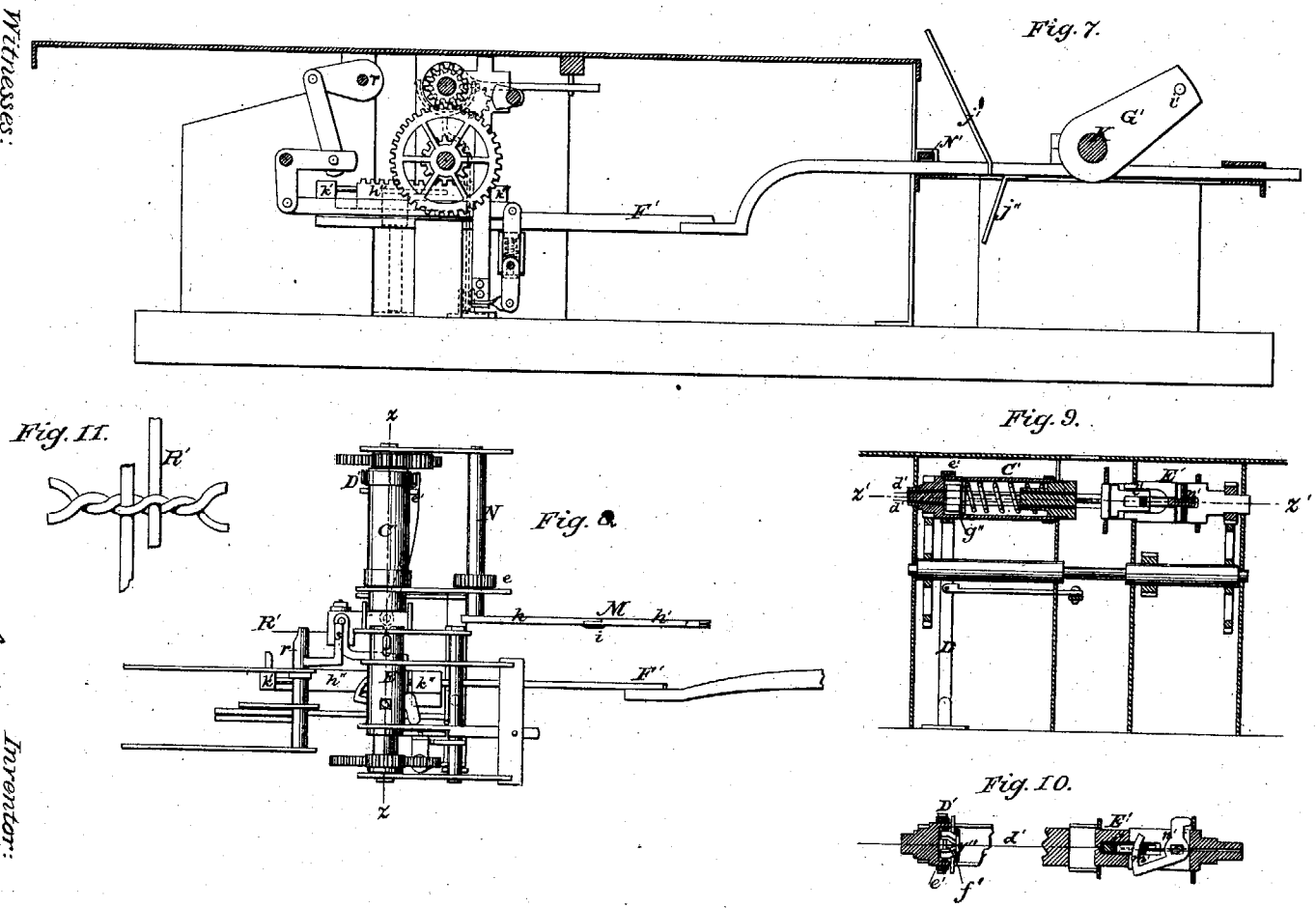
Witnesses:
C. Clarence Poole
Aug. Jordan
Inventor:
Israel Lancaster,
By his atty
R. D. Smith.
N. PETERS, PHOTO-LITHOGRAPHER, WASHINGTON, D. C.

UNITED STATES PATENT OFFICE.

ISRAEL LANCASTER, OF RICHMOND, INDIANA, ASSIGNOR TO SYLVANUS D. LOCKE.

IMPROVEMENT IN GRAIN-BINDERS.

Specification forming part of Letters Patent No. 52,175, dated January 23, 1866; reissue No. 7,491, dated February 6, 1877; application filed December 19, 1876.

*To all whom it may concern:*

Be it known that I, ISRAEL LANCASTER, of Richmond, in the county of Wayne and State of Indiana, but formerly of Baltimore, in the State of Maryland, have invented a new and Improved Device for Binding Grain; and I do hereby declare that the following is a full and exact description thereof, reference being had to the accompanying drawings, wherein—

Figure 1:
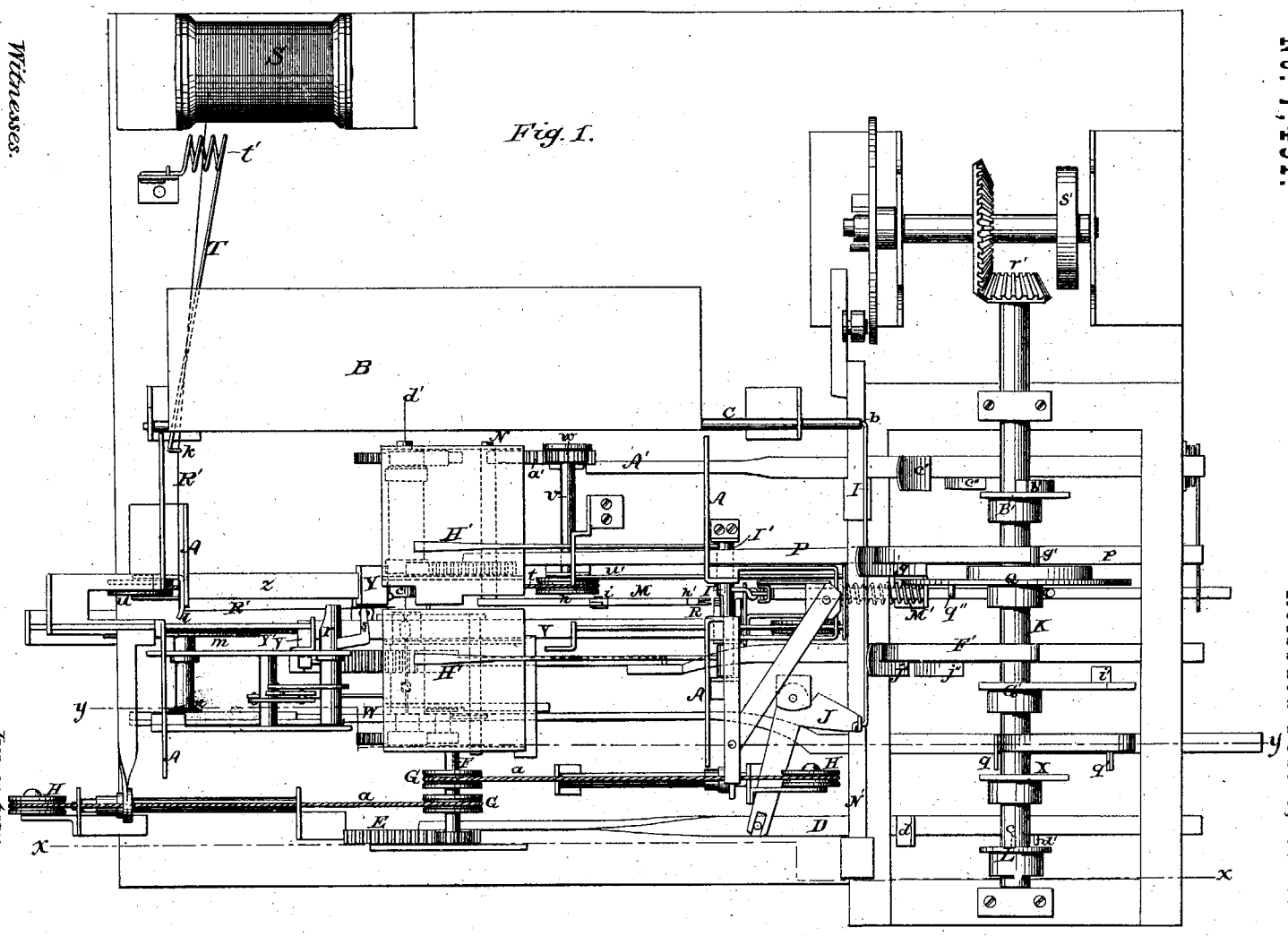
Figure 2:
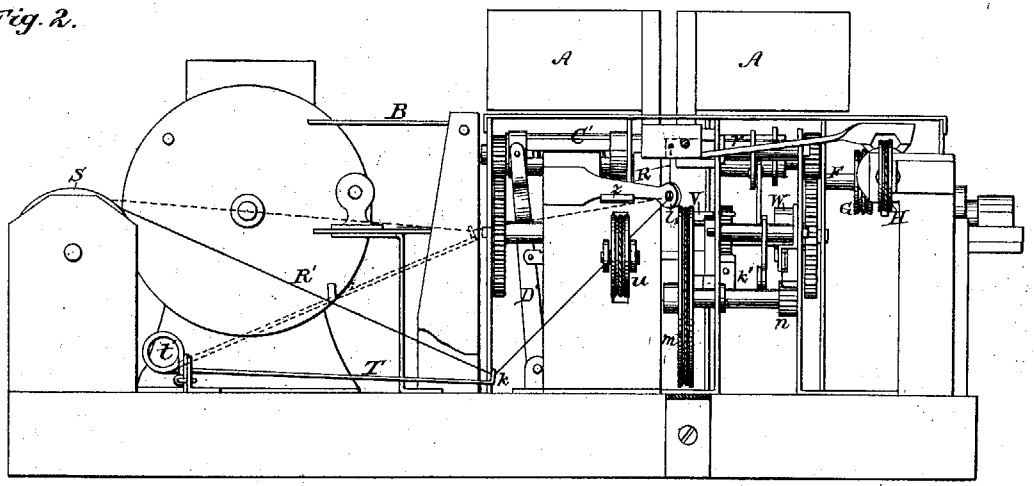
Figure 12:
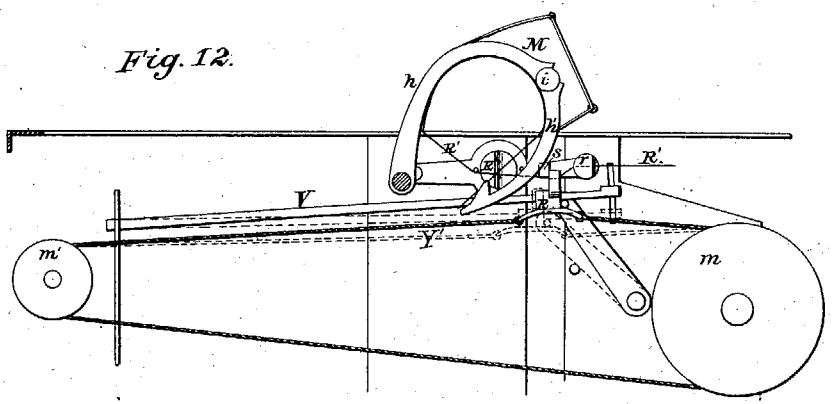
Figure 3:
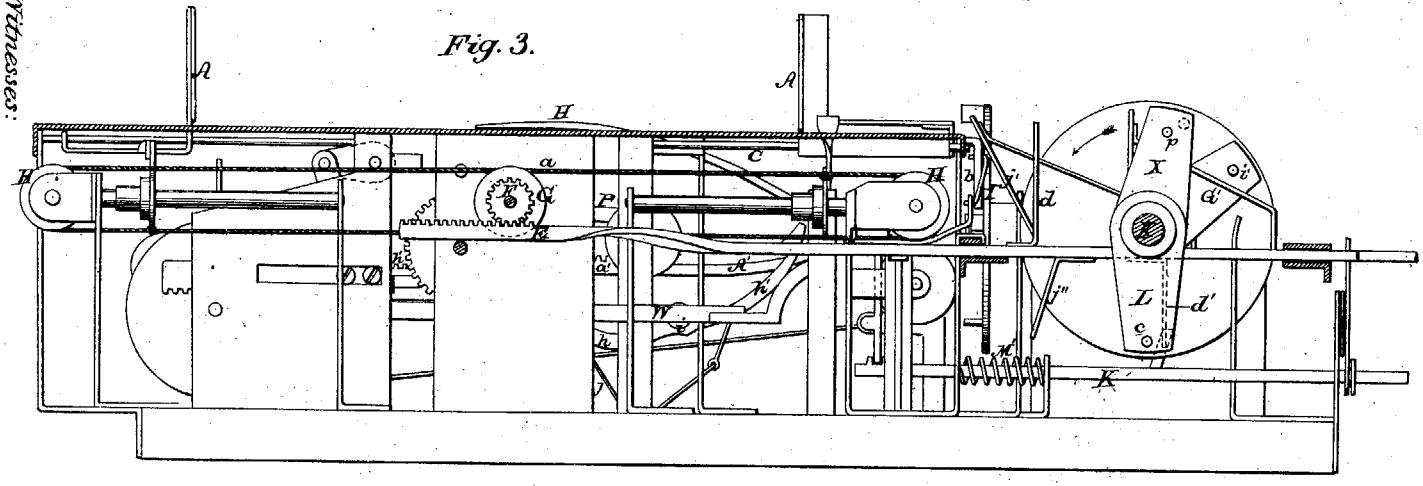
Figure 4:
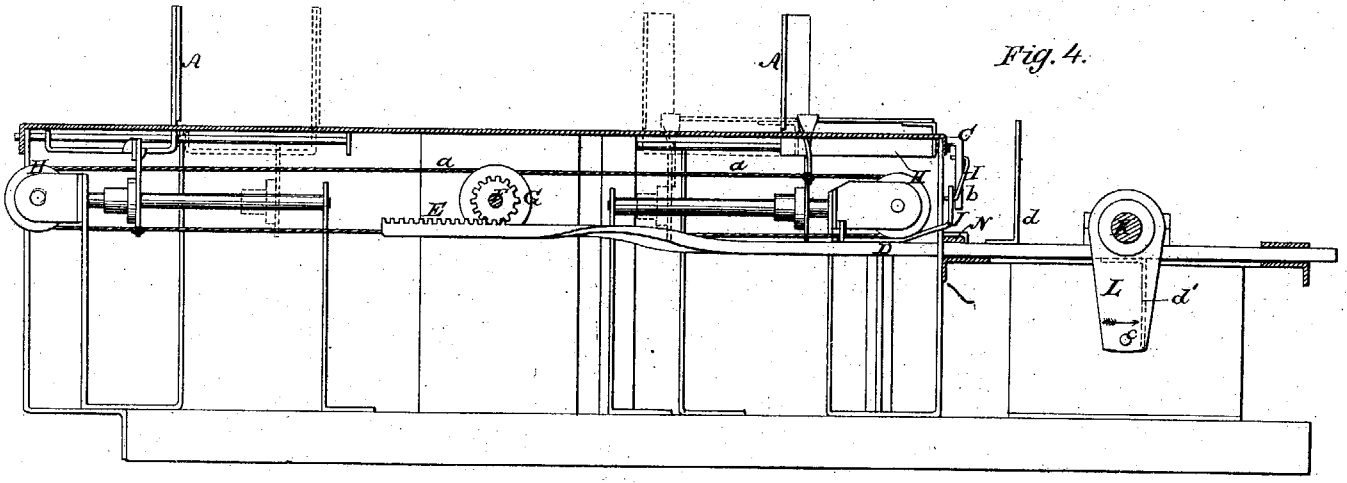
Figure 5:
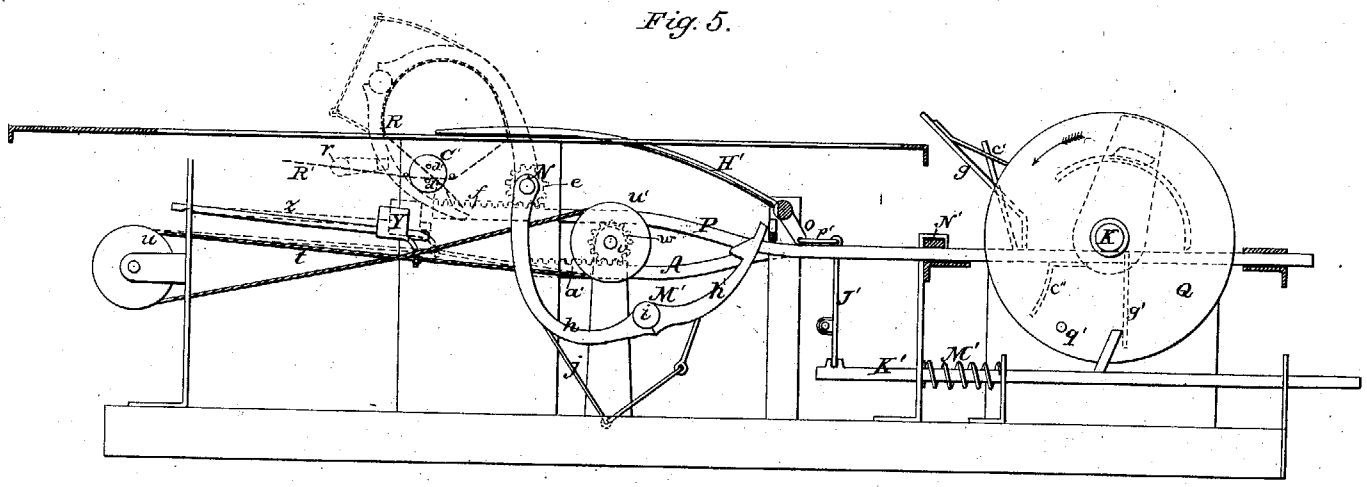
Figure 6:
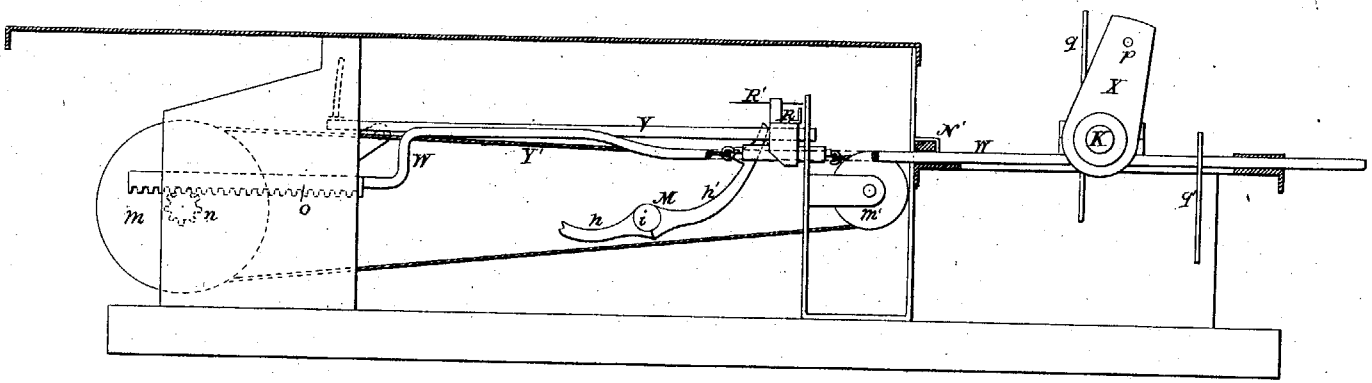

Figure 1 is a plan of my machine. Fig. 2 is an end elevation of the same. Fig. 3 is a side sectional elevation taken in the line *x x*, Fig. 1. Fig. 4 is a detached side view of certain working parts which operate the gatherers. Fig. 5 is a detached side view of certain working parts which operate the band-carrier and adjust the band around the sheaf. Fig. 6 is a detached side view of certain parts which operate the cord-carrier. Fig. 7 is a detached side view of certain parts which operate the wire-twisters. This view may be considered as a section taken on line *y y*, Fig. 1. Fig. 8 is a plan of the principal parts shown in Fig. 7. Fig. 9 is a vertical transverse section of parts shown in Figs. 7 and 8, taken on line *z z* of Fig. 8. Fig. 10 is a horizontal section on line *z′ z′* of Fig. 9. Fig. 11 is an enlarged view of the method of fastening the ends of the band which I have preferred. Fig. 12 is a sectional elevation, showing the band carrier and twisters from the rear.

Similar letters of reference indicate corresponding parts.

This invention relates to a new and improved device for binding grain, and is designed for an automatic attachment for reapers, to operate in conjunction therewith, and gather up the cut grain as it is presented to the device and bind it into sheaves, which are cast from the reaper as they are bound.

The characteristic features of my invention are, first, the devices for carrying the band around the sheaf and securing the ends of the same; and, second, a device for taking up the slack of said band and tightening the same around the sheaf, said slack take-up being located intermediate as to the spool or reel from which the band is drawn and the mechanism for carrying the same and securing its ends.

It is evident that these two features are so far separable and distinct that either may be employed with mechanism other than that described—that is to say, the devices herein described for gathering and compressing the grain and for carrying and fastening the band would operate with a different slack take-up, and my intermediate device for taking up the slack of the band would operate with equal advantage with gathering and binding mechanism of other description. It is also evident that, for bands, any material may be employed which can be wound upon, and fed from, a spool or reel.

Having now indicated the nature of my invention, I will particularly describe its structure and mode of operation.

The first operation consists in gathering the grain after the rake has deposited the gavel on the platform at the rear of the sickle. These gatherers consist of upright sliding plates A, arranged in pairs, so as to move simultaneously toward and from each other, and, besides these plates, a wing, B, arranged so as to work on journals, or it may be attached to a shaft, C. (See Fig. 1.) These gatherers—to wit, the sliding plates A and wing B—are operated simultaneously; the two pairs of wings A approaching each other and the wing B at the same time, so as to compact the gavel, the plates A operating on the sides of the gavel, and the wing B on the end or butts of the grain. The gatherers are operated by the following means: D is a sliding bar, provided with a rack, E, which gears into a pinion on a shaft, F, the latter having two pulleys, G G, around which and pulleys H H on uprights in the framing of the device cords or belts *a a* pass, to which cords or belts the wings or belts A are attached. The wing B is operated by having its shaft C bent at one end to form a crank, *b*, and this crank is connected by a rod, I, with a lever, J, which is connected with the bar D. (See Figs. 1, 3, 4.) This bar D has a reciprocating motion given it from a shaft, K, from which motion is communicated to all the operating parts. The shaft K has an arm, L, upon it, from which a pin, *c*, projects horizontally, and, as the shaft K rotates, acts alternately against arms *d d′*, one of which, *d*, is attached vertically to the upper side of D, and the other, $d'$, depends from its under side. (See Figs. 3 and 4.) These gatherers compact the gavel of grain in such a manner that it will be in a proper condition to receive the band and form a well-proportioned sheaf. I design to have the wing B corrugated or grooved on its face side—the side which is brought in contact with and acts upon the grain—in order that it may catch against the butts of the grain, so that the latter may be brought all even with each other as the two pairs of plates A approach each other and compact it.

The second operation consists in placing the band around the sheaf. This is effected by means of a curved arm, M, which I term a "band-carrier." The band-carrier M is attached to a shaft, N, having a pinion, $e$, upon it, into which a rack, $f$, on a reciprocating bar, P, gears. This bar P is operated from the shaft K by means of a cam, Q, which acts against two projections, $g$ and $g'$. (See Fig. 5.)

The band-carrier M is of curved form, and is composed of two parts, $h$ $h'$, connected by a joint, $i$. Said parts are kept distended by means of a spring, $j$, as shown in Fig. 5. The band R′ is wound upon a spool or reel, S, which is so controlled that it cannot turn casually, but only as fast as the band requires to be unwound for actual use. The band R′ passes from the spool S to a guide-eye, $l$, and thence to the carrier R, which is provided with a jaw to receive and hold the band, and moves on a horizontal bar or guide, V, and is operated by means of an endless band, Y′, which passes around pulleys $m$ $m'$. The shaft of pulley $m$ has a pinion, $n$, upon it, which gears with a rack, $o$, on a reciprocating bar, W, to which motion is given from the shaft K by means of an arm, X, provided with a pin, $p$, which acts against the projections $q$ $q'$ on said bar. (See Fig. 6.) The band R′ also passes through an eye in the shaft $r$, and said shaft is provided with an arm, $s$, to adjust the band in the carrier R each time the latter reaches a position at that end of its movement; therefore, each time said carrier R moves backward toward the shaft K, it carries the end of the band with it, so that a jaw at the end of the band-carrier M will catch it as it rises, and carry the band over and around the sheaf, as shown in Fig. 5. When the band-carrier M has been thus thrown over the sheaf it is acted upon by what I term a "sheaf-presser," Y. This sheaf-presser moves upon a guide-bar, $z$, and it is operated by a cord, $t$, which passes over pulleys $u$ $u'$. The pulley $u'$ is mounted on a shaft, $v$, which also has a pinion, $w$, upon it, into which a rack, $a'$, on the reciprocating bar A gears. Said bar A takes motion from the shaft K by means of an arm, B′, thereon, which is provided with a lateral projection, $b'$, to act against projections $c'$ $c''$. The sheaf-presser Y performs an important function, to wit: It presses against the outer part of $h'$ of the band-carrier M, and forces the band between the wires $d'$ $d'$, as shown in Fig. 5. These wires $d'$ $d'$ pass through a horizontal cylinder, C′, which has a transverse position relatively with the band-carrier M. The wires $d'$ $d'$ are to be wound upon, and fed from, suitable reels attached to the machine. The wires $d'$ $d'$ are, at the proper moment, projected forward across the band R′, and inclosing the lapped ends or portions of the same between them by means of a lever, D′, the upper end of which is connected to a collar, $e'$, on the cylinder C′. Said collar $e'$ is connected to a pair of jaws, $f'$, which grasp the wires as they are moved forward, in consequence of passing into a collar, $g''$. (See Fig. 10.) This movement of the wires $d'$ $d'$ causes them to be thrown into a slot in a horizontal cylinder, E′, which is in line with the cylinder C′. The two cylinders C′ and E′ are rotated in reverse directions by means of suitable gearing operated by a rack, $h''$, on a reciprocating bar, F′, which takes motion from the shaft K by means of an arm, G′, which is provided with a pin, $i$, which acts against projections $j'$ $j''$ on said bar, F′. (See Fig. 7.)

The rack $h''$ is not rigidly attached to the bar F′, the latter being allowed to move freely a certain distance in order to admit the two hubs $k'$ $k''$ to intermittently actuate the rock-shaft $r$, on which the elbow-arm $s$ is secured, to adjust the band in the jaw of the carrier R. The band is by the same movement severed by the arm $s$ between the carrier R and the bound bundle. The hub $k''$ intermittently actuates a series of levers, which actuate the lever D′.

The rotation of the two cylinders C′ and E′ twists the wires $d'$ $d'$ around the lapped ends of the band, as will be fully understood by referring to Fig. 11, and secures the band firmly around the sheaf.

The slot in the end of the horizontal cylinder E′ is opened, in this instance, by means of a slide, $l'$, actuated by a curved arm on a lever, $n'$, to which motion is given from the bar F′, through the medium of any suitable means. The bound sheaf is cast from the platform by means of two arms, H′ H′, which are attached to a shaft, I′. This shaft has an arm, $o'$, extending down from it, and said arm is connected by a link, $p'$, with a lever, J′, the lower end of which is connected with a reciprocating bar, K′, which is operated in one direction, so that the arms H′ will suddenly rise to throw the sheaf off from the platform by means of a pin, $q'$, on the cam Q, the arms H′ H′ being thrown back again upon the platform by means of the spring M′ upon the bar K′.

The shaft K may be driven by means of bevel-gears $r'$ and spur-gears $s'$ from the axle of the machine, and the several reciprocating bars which are operated from the shaft K may all be disconnected therefrom, or thrown out of the reach of the cams and arms thereon, and connected therewith by means of a sliding bar, N′, which may be adjusted automatically.

Heretofore, when in grain-binding machines devices have been used for taking up the slack of the band and tightening the same around the bundle, such devices have been connected directly to the spool or reel upon which the band has been wound, and therefore such take-up devices have been irregular in action, because they have been influenced by the weight of the band material upon the reel, which is a constantly-decreasing weight as the band is drawn off and used, and it is also subject to the effect of a constantly-diminishing leverage as the diameter of the coil of band material becomes less. These varying conditions do not counterbalance each other, but are cumulative disadvantages, because the power of the take-up is a constant quantity acting in opposition to the inertia of the coil of band material, and against the leverage due to the length of the semi-diameter of said coil, and evidently, as said weight and leverage both decrease, the power of the take-up will be relatively increased in a corresponding ratio. But a take up device separate from the spool or reel, and located intermediate as to said spool and the devices for carrying the band around the sheaf and fastening it, is not liable to this unequal action, because it acts upon a uniform length and weight of the band—to wit, that portion extending from the reel to the carrying device—and it therefore exerts a positive and uniform action in tightening the band, entirely independent of the tension, which prevents an undue discharge of the band material from the spool.

The regular movements of binding mechanism will, at each recurrence, draw off a certain definite quantity of the band, and if this quantity is sufficient exactly to encircle the bundle, or is less than sufficient so to do, no slack will be made, because all, or more than all, that the machine would of itself draw off will be consumed on the bundle under treatment; but if the quantity is more than sufficient to encircle said bundle, then the surplus, whether it is more or less, must be drawn back again, and the band tightened around the bundle by the slack take-up. Bundles will necessarily vary more or less in size, and all of these conditions will occur, so that the slack take-up enables the machine to meet them all successfully.

In the drawing, the intermediate take-up is represented by the arm T, which vibrates upon a fulcrum at one end, secured to the frame of the machine. A spring, *t*, makes the arm T elastic, and constantly tends to move said arm away from the right line joining the spool S and the guide *l*, through which the band R′ passes. At the free end of the arm T there is a loop or eye, *k*, through which said band is passed, so that when it is slack said arm draws the band downward out of a right line, as shown in Fig. 2.

When the band is to be drawn off the spool, the slack take-up will yield first, and when the band has been drawn up, as shown in dotted line, Fig. 2, the pull will overcome the tension on the spool, and the band will be unwound therefrom. When the pull ceases and begins to give back, the take-up will instantly begin to act, to take up any slack which may exist.

I am aware that intermediate take-up devices of various kinds have been employed in connection with machinery of a different class—as, for instance, the take-up device of Liverus Hull, 1855, in a braiding-machine, and the take-up devices used with sewing-machines; but, so far as I know, no intermediate take-up device of any description has heretofore been put in combination with machinery adapted and intended for the binding of grain, and therefore do not limit myself to the structure or particular mode of operation of the take-up shown therein.

I do not confine myself to the precise arrangement of the detail of the invention herein described. Most of the parts, so far as detail of construction is concerned, may be modified in various ways which would suggest themselves to a mechanic.

Having described my invention, what I claim as new is—

1. The band-carrier M, constructed of two parts, connected by a joint, in combination with the band-carrier R, substantially as and for the purpose set forth.

2. The sheaf-presser Y, in combination with the band-carrier M and the rotating wire-twisting cylinders C′ E′, substantially as and for the purpose specified.

3. The sliding plates A A and wing B, comprising the gatherers, substantially as described, and for the purpose set forth.

4. The sheaf-dischargers H′ H′, arranged to operate in the manner substantially as described.

5. The reciprocating bars D P W A′ F′, arranged as herein described, to communicate motion to the various operating parts from a single driving-shaft, K.

6. The reciprocating carrier R, with a jaw to receive and gripe the band, combined with the rock-shaft *r*, provided with the projecting elbow-arm *s*, to force said band down into the jaw of the carrier and sever it between said jaw and the bound bundle, as set forth.

7. The reciprocating bars D P W A′ F′, combined with the transverse bar N′, whereby said reciprocating bars may be thrown out of engagement with their driving-cams.

8. The combination, in a binding-machine, of a spool or reel to bear the binding material, mechanism carrying said binding material around the bundle and uniting the same, and an intermediate slack take-up to tighten the band around the bundle prior to its being fastened.

ISRAEL LANCASTER.

Witnesses:
SAMUEL S. MOTE,
WILLIAM H. THOMPSON.